United States Patent
Agrawal et al.

(10) Patent No.: US 11,345,426 B1
(45) Date of Patent: May 31, 2022

(54) CHASSIS FOR A TWO-WHEELER

(71) Applicant: Oben Electric Vehicles Private Limited, Bangalore (IN)

(72) Inventors: Dinkar Agrawal, Bangalore (IN); Madhumita Agrawal, Bangalore (IN); Aditya Ganjapure, Nagpur (IN); Sagar Thakkar, Ahmedabad (IN)

(73) Assignee: Oben Electric Vehicles Private Limited

( * ) Notice: Subject to any disclaimer, the term of this patent is extended or adjusted under 35 U.S.C. 154(b) by 0 days.

(21) Appl. No.: 17/185,330

(22) Filed: Feb. 25, 2021

(30) Foreign Application Priority Data

Feb. 5, 2021 (IN) .............................. 202141005004

(51) Int. Cl.
*B62J 43/28* (2020.01)
*B62K 19/06* (2006.01)

(52) U.S. Cl.
CPC .............. *B62J 43/28* (2020.02); *B62K 19/06* (2013.01)

(58) Field of Classification Search
CPC ... B62J 43/13; B62J 43/16; B62J 43/20; B62J 43/23; B62J 43/28; B62K 19/06; B62K 2202/00; B62K 2204/00; B62M 6/90
USPC ..................................... 180/220, 207.3, 68.5
See application file for complete search history.

(56) References Cited

U.S. PATENT DOCUMENTS

| | | | |
|---|---|---|---|
| 1,843,691 A | 2/1932 | Mancha et al. | |
| 3,477,538 A | 11/1969 | Hall et al. | |
| 5,360,307 A | 11/1994 | Schemm et al. | |
| 5,633,095 A | 5/1997 | Ishikawa et al. | |
| 6,357,070 B1 | 3/2002 | Venard et al. | |
| 2001/0013437 A1 | 8/2001 | Husted et al. | |
| 2013/0241170 A1 | 9/2013 | Talavasek | |

(Continued)

FOREIGN PATENT DOCUMENTS

| CN | 2772872 Y | 4/2006 |
|---|---|---|
| CN | 211893502 | * 11/2020 |

(Continued)

OTHER PUBLICATIONS

CN211893502 to Chen et al., published Oct. 11, 2020, translation (Year: 2020).*

(Continued)

*Primary Examiner* — Anne Marie M Boehler
(74) *Attorney, Agent, or Firm* — Jason C. Cameron (57) ABSTRACT

Embodiments of the present disclosure relate to a chassis for a two-wheeler. The chassis includes a first downtube and a second downtube and a battery mounting system. The battery mounting system includes a movable battery housing configured to house a battery under a seat of the two-wheeler and move between a closed position and an open position, at least two support members configured to support the movable battery housing, and at least one pivot hinge coupled to a front side of the movable battery housing and supporting the movable battery housing. The at least two support members and the at least one pivot hinge are configured to enable an angular movement of the movable battery housing with respect to a seat axis between the open position and the closed position, thereby enabling replacement of the battery located under the seat of the two-wheeler, while maintaining a closed seat position of the seat.

17 Claims, 6 Drawing Sheets

(56) References Cited

U.S. PATENT DOCUMENTS

| | | | |
|---|---|---|---|
| 2015/0075888 A1* | 3/2015 | Duncan | B62K 25/283 |
| | | | 180/219 |
| 2018/0118298 A1* | 5/2018 | David | B62M 7/02 |
| 2019/0232804 A1* | 8/2019 | Chen | B62J 43/16 |
| 2022/0041244 A1* | 2/2022 | Upadhyay | B62J 11/00 |
| 2022/0081055 A1* | 3/2022 | Okabe | B60L 53/80 |

FOREIGN PATENT DOCUMENTS

| | | | |
|---|---|---|---|
| CN | 212354263 | * | 1/2021 |
| WO | WO-2021070897 A1 | * | 4/2021 |

OTHER PUBLICATIONS

CN212354263 to Lin, published Jan. 15, 2021, translation (Year: 2021).*

* cited by examiner

CHASSIS FOR A TWO-WHEELER

EARLIEST PRIORITY DATE

This application claims priority from a complete patent application filed in India having Patent Application No. 202141005004, filed on Feb. 5, 2021, and titled "A CHASSIS FOR A TWO-WHEELER".

FIELD OF INVENTION

Embodiments of a present disclosure relate to two-wheeler, and more particularly to a chassis for a two-wheeler.

BACKGROUND

Electric two-wheelers (EV) are rapidly gaining popularity among users as an environment friendly and clean alternative to fossil fuel-based two-wheelers. In the electric two wheelers such as bikes and scooters, housing and placement of a large battery plays a very critical role in its design, balancing centre of gravity, and ease of recharge or swapping of the battery.

In the electric two-wheeler, the battery is rechargeable. There are two modes of implementation prevalent in industry, namely the battery being permanently housed inside body of the electric two-wheeler, and the battery being configured to be swappable or replaceable.

Conventionally, where the battery is permanently housed inside body of the electric two-wheeler, a charging port is provided in the electric two-wheeler to enable users to recharge the battery as and when required. However, this mode of implementation has two main drawbacks, namely the user needs to find charging docks/bay or install a charging dock in his premise for ease of access or park his/her electric two-wheeler for a couple of hours for recharging the battery of electric two-wheeler in charging bay/dock. Such situations cause lot of inconvenience to the users.

In most cases, where the battery is made replaceable, a particular part of the two-wheeler has to be opened up, such as seats, footrests and the like to give access to the battery. This arrangement enables users to replace the battery when depleted rather than charging it, however such designs compromise with safety and structural integrity of the two-wheeler. It also adds additional task for the user to open up the seat or footrest using vehicle keys or an opening tool. Further, the user cannot outsource the battery swapping to a service provider, since the user has to be physically present when battery is being swapped.

Hence, there is a need for an improved chassis for the electric two-wheelers for enabling easy replacement of the battery and therefore address the aforementioned issues.

BRIEF DESCRIPTION

In accordance with one embodiment of the disclosure, a chassis for a two-wheeler is disclosed. The chassis includes a first downtube and a second downtube connected to a neck stem of the chassis, wherein each of the first downtube and the second downtube comprises an upper front section, a lower front section, a lower rear section, an upper rear section, and a seat support section. The lower rear section of the first downtube and the second downtube are connected via a first bar and a second bar. The chassis also includes a battery mounting system, which includes a movable battery housing configured to house a battery under a seat supported by the seat support section of the two-wheeler and move between a closed position and an open position. The battery mounting system also includes at least one support member configured to support the movable battery housing, wherein a first end the at least one support member is coupled to the seat support section and a second end of the at least one support member is coupled to the movable battery housing. The battery mounting system further includes at least one pivot hinge mounted on the first bar and coupled to a front side of the movable battery housing, wherein the at least one pivot hinge is configured to support the movable battery housing. The at least one support member and the at least one pivot hinge are configured to enable an angular movement of the movable battery housing with respect to a seat axis between the open position and the closed position, thereby enabling replacement of the battery located under the seat of the two-wheeler, while maintaining a closed seat position of the seat.

In accordance with a further embodiment of the chassis for the two-wheeler, the chassis also includes a battery housing locking system configured to lock the movable battery housing in the closed position. The battery housing locking system includes a securing means coupled to a bottom side of the movable battery housing, and a locking means mounted on the second bar and configured to detachably connect with the securing means in the closed position to lock the battery in the closed position, and disconnect with the securing means upon unlocking of the movable battery housing.

In accordance with another embodiment of the disclosure, a two-wheeler is disclosed. The two-wheeler includes a chassis comprising a first downtube and a second downtube connected to a neck stem of the chassis, wherein each of the first downtube and the second downtube comprises an upper front section, a lower front section, a lower rear section, and an upper rear section and a seat support section. The lower rear section of the first downtube and the second downtube are connected via a first bar and a second bar. The two wheeler also includes a battery mounting system which includes a movable battery housing configured to house a battery under a seat supported by the seat support section of the two-wheeler and move between a closed position and an open position, at least one support member configured to support the movable battery housing, wherein a first end of the at least one support member is coupled to the seat support section and a second end of the at least one support member is coupled to the movable battery housing, and at least one pivot hinge mounted on the first bar and coupled to a front side of the movable battery housing, wherein the pivot hinge is configured to support the movable battery housing. The at least one support member and the at least one pivot hinge are configured to enable an angular movement of the movable battery housing with respect to a seat axis between the open position and the closed position, thereby enabling replacement of the battery located under the seat of a vehicle, while maintaining a closed seat position of the seat.

In accordance with a further embodiment of the two-wheeler, the said two-wheeler also includes a battery housing locking system configured to lock the movable battery housing in the closed position. The battery housing locking system includes a securing means coupled to a bottom side of the movable battery housing, and a locking means mounted on the second bar and configured to detachably connect with the securing means in the closed position to lock the battery in the closed position, and disconnect with the securing means upon unlocking of the movable battery housing.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relates to a chassis for a two-wheeler for housing a battery under a seat of the two-wheeler and enable replacement of the battery while maintaining a closed seat position of the seat. The two-wheeler includes electric two-wheeler or electric vehicles such as bikes, scooters, and the like.

Figure 1:
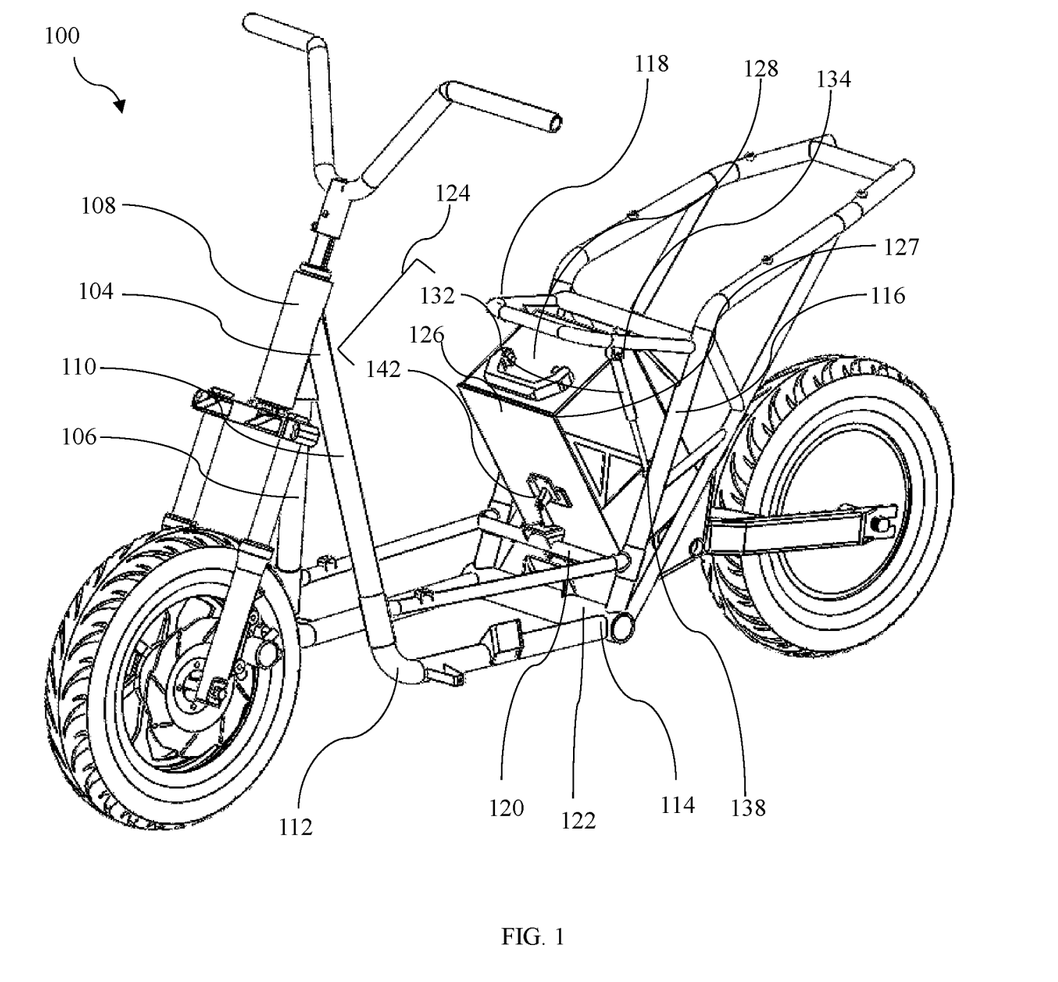
FIG. 1 is a schematic representation of a chassis for a two-wheeler in accordance with an embodiment of the present disclosure.

FIG. 1 illustrates the chassis 102 for the two-wheeler 100 in accordance with an embodiment of the present disclosure. A left perspective view of the two-wheeler 100 is illustrated and accordingly, certain components of the chassis 102 and the two-wheeler 100 may not be visible in FIG. 1.

In an embodiment, the chassis 102 for the two-wheeler 100 includes a first downtube 104 and a second downtube 106 connected to a neck stem 108 of the chassis 102. Each of the first downtube 104 and the second downtube 106 is divided into an upper front section 110, a lower front section 112, a lower rear section 114, an upper rear section 116, and a seat support section 118. The seat support section 118 extends from the end of the upper rear section 116 and overarches towards a front side of the chassis 102 to support a seat. The first downtube 104 and the second downtube 106 are configured to run side by side and include a plurality of bends at predefined angles to give a specific shape to the chassis 102.

The upper front section 110 of the first downtube 104 and the second downtube 106 are connected to the neck stem 108 of the chassis 102 at a common point, respectively.

The lower rear section 114 of the first downtube 104 and the second downtube 106 are connected via a first bar 120 and a second bar 122 to impart structural strength to the chassis 102. The first bar 120 is positioned above the second bar 122 at a predefined distance.

In another embodiment, the chassis 102 for the two-wheeler 100 includes a battery mounting system 124. In such an embodiment, the battery mounting system 124 includes a movable battery housing 126, at least one support member 132, and at least one pivot hinge 142.

Figure 2:
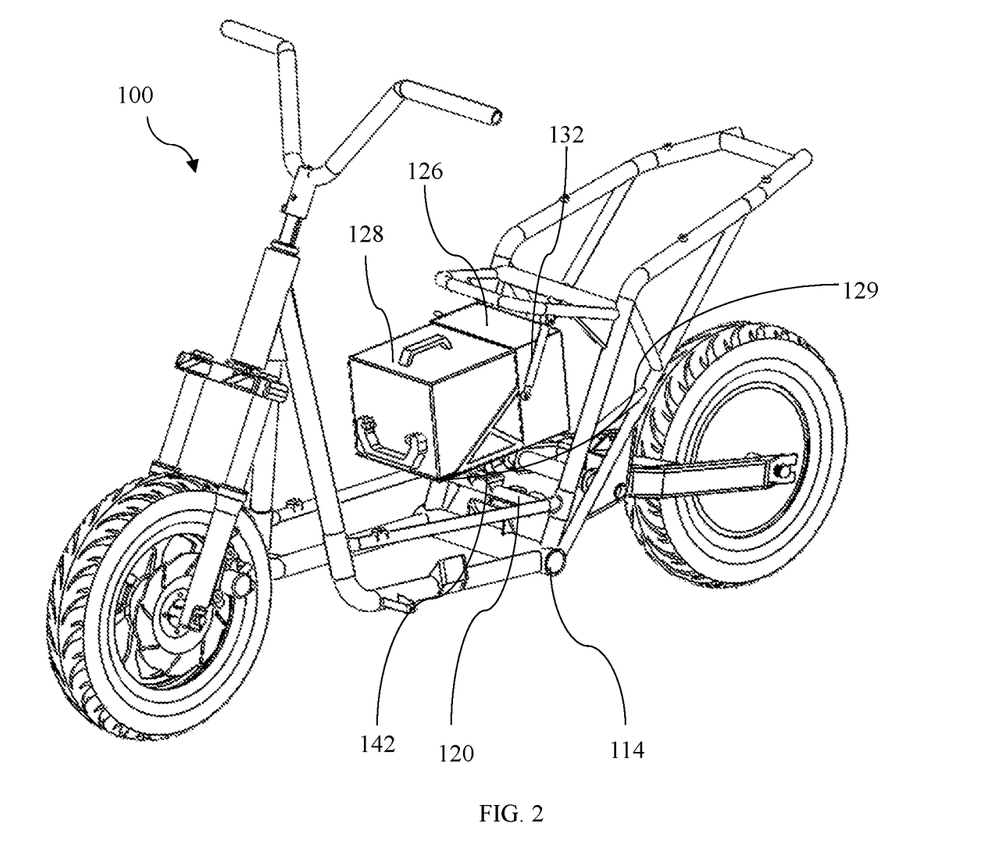
FIG. 2 is a schematic representation of the chassis for the two-wheeler showing a movable battery housing in an open position in accordance with an embodiment of the present disclosure.

The movable battery housing 126 is configured to house a battery 128 under a seat (not shown in FIG. 1) supported by the seat support section 118 of the two-wheeler 102. Further, the movable battery housing 126 is also configured to move between a closed position 127 and an open position 129 (FIG. 2). FIG. 1 illustrates the closed position where the movable battery housing 126 is tucked under the seat and the battery 128 is locked inside the movable battery housing 126. FIG. 2 illustrates the open position 129 where the movable battery housing 126 is moved out towards a front end of the two-wheeler and the battery 128 may be pulled out from the movable battery housing 126 for replacement. In an embodiment, the movable battery housing 126 is configured to have shape of a rectangular cuboid, rectangular box, cube, cubical box, 3D trapezoid and its variations.

The at least one support member 132 is configured to support the movable battery housing 126. A first end 134 of the at least one support member 132 is coupled to the seat support section 118 and a second end 138 of the at least one support member 132 is coupled to the movable battery housing 126. Such configuration enables placement of the movable battery housing 126 under the seat via the at least one support member 132 and imparts a flexibility of angular movement to the movable battery housing 126 without moving the seat.

In one embodiment, the at least one support member 132 may include one support member, wherein the first end 134 may be connected to the seat support section 118 and the second end 138 of the support member is coupled to a top portion of the movable battery housing 126. In another embodiment, the least one support member 132 comprises two support members. A first end of each of the two support members is coupled to the seat support section 118 and a second end 138 of each of the two support members is coupled to a left side and a right side of the movable battery housing 126, respectively.

In an embodiment, the at least one support member 132 may be kinematic linkages. In another embodiment, the kinematic linkages comprise dampers. In yet another embodiment, the dampers include, but not limited to, a gas spring damper, a hydraulic gas spring, and the like.

The at least one pivot hinge 142 is configured to be mounted on the first bar 120 and coupled to a front side of the movable battery housing 126. The at least one pivot hinge 142 is configured to support the movable battery housing 126. As the name indicates, the at least one pivot hinge 142 acts as a pivot and facilitates the angular movement to the movable battery housing 126. Therefore, the at least one support member 132 and the at least one pivot hinge 142 are configured to enable the angular movement of the movable battery housing 126 with respect to a seat axis (discussed below) between the open position 127 and the closed position 129. Such angular movement enables easy access and replacement of the battery 128 located under the seat of the two-wheeler 102, while maintaining a closed seat position of the seat. Thus, the seat is not required to be lifted or opened for the replacement of the battery 128 making process of battery replacement quick and user friendly without compromising structural integrity or exposing any other parts of the two-wheeler and without any intervention of an owner of the vehicle.

Figure 3:
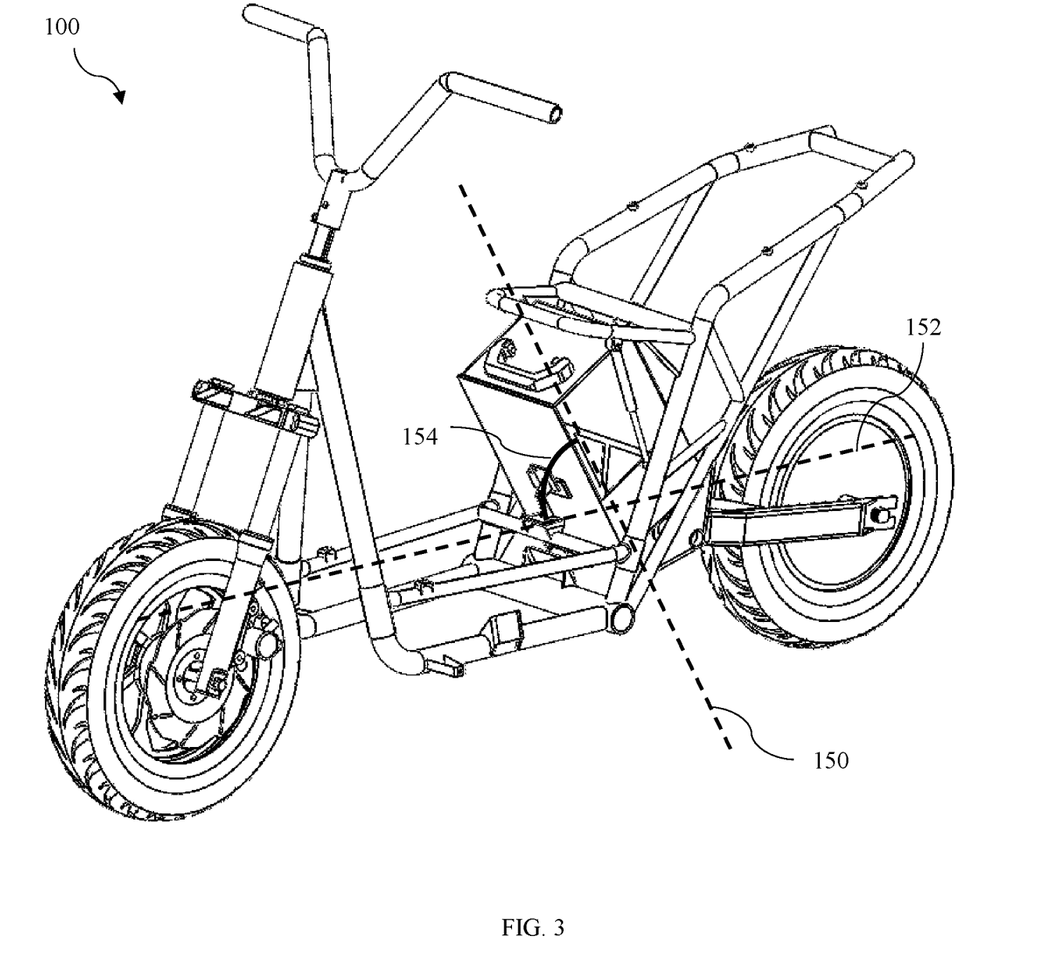
FIG. 3 is a schematic representation of the chassis for the two-wheeler illustrating a first axis representative of the seat axis and a second axis representative of battery axis in accordance with an embodiment of the present disclosure.

FIG. 3 illustrates a first axis 150 representative of the seat axis and a second axis 152 representative of battery axis in accordance with an embodiment of the present disclosure. An angle 154 between the first axis 150 and the second axis 152 depicts the angular movement of the movable battery housing 126.

Figure 4:
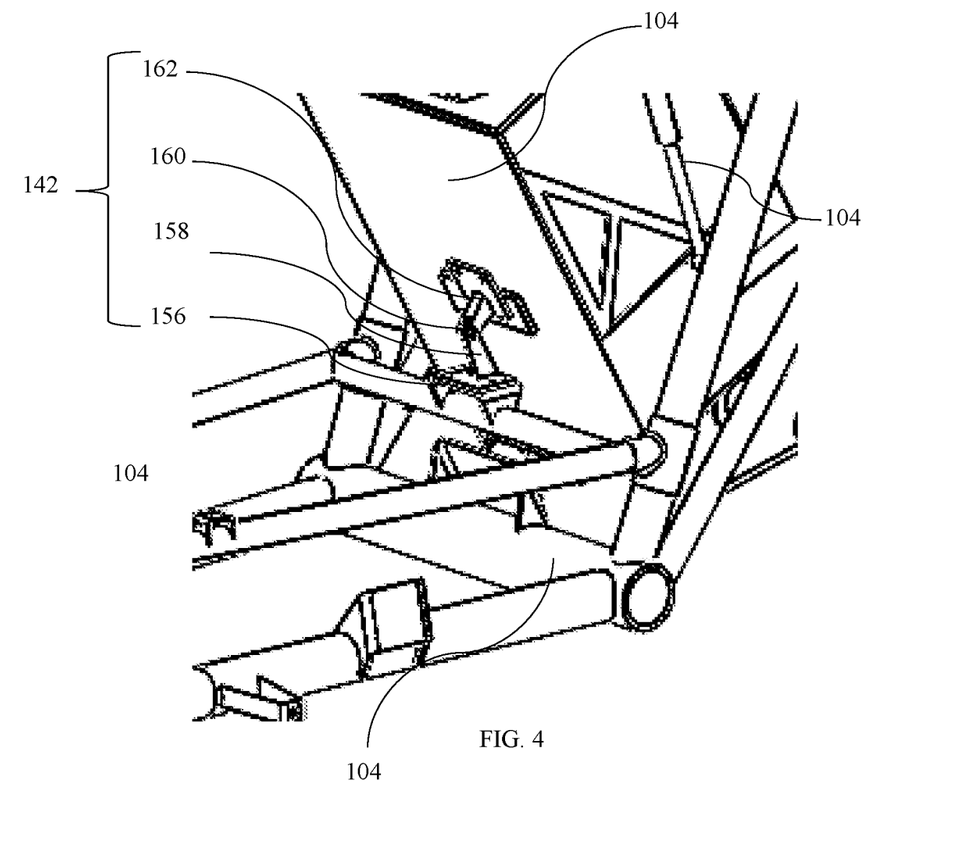
FIG. 4 is a schematic representation of at least one pivot hinge in accordance with an embodiment of the present disclosure.

FIG. 4 illustrates at least one pivot hinge 142 in accordance with an embodiment of the present disclosure. The at least one pivot hinge 142 may include a base section 156 coupled to the first bar 120, a first arm 158 coupled to top side of the base section 156, and second arm 162 coupled to the front side of the movable battery housing 126, and a pin 160 connecting the first arm 158 and the second arm 160, thereby enabling movement of hinge joint.

Figure 5:
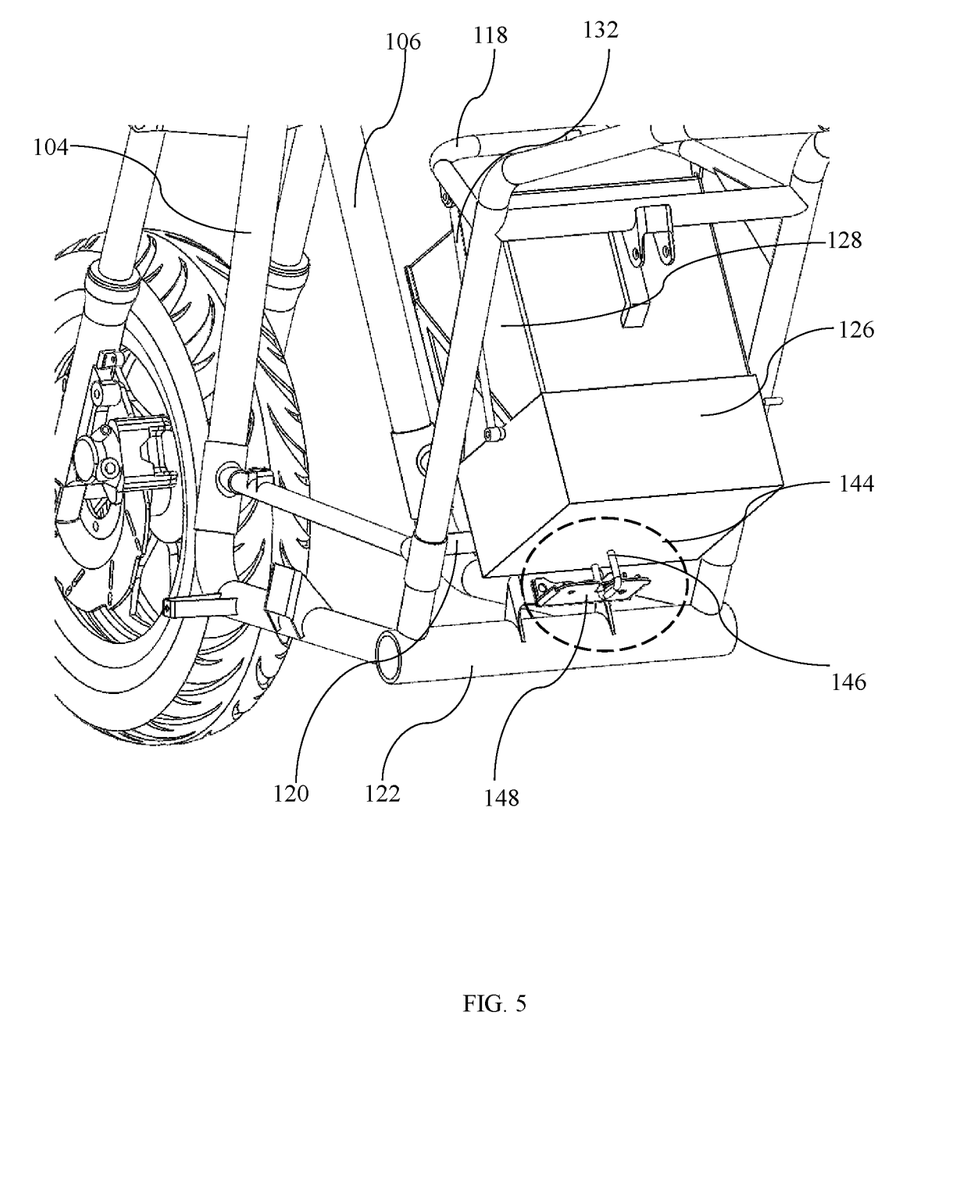
FIG. 5 is a schematic representation of a battery housing locking system in accordance with an embodiment of the present disclosure.

In a further embodiment, the chassis 102 for the two-wheeler 100 also includes a battery housing locking system 144 which is configured to lock the movable battery housing 126 in the closed position. The battery housing locking system 144 includes a securing means 146 coupled to a bottom side of the movable battery housing 126, and a locking means 148 mounted on the second bar 122. The locking means 148 is configured to detachably connect with the securing means 146 in the closed position to lock the battery 128 in the closed position, and disconnect with the securing means 146 upon unlocking of the movable battery housing 126.

In an embodiment, the securing means 146 may include a hook, a shackle, a metal bar, a deadbolt, a spring bolt, and the like. In such an embodiment, the hook is a piece of metal or other hard material curved or bent back at an angle. In such an embodiment, the shackle, also known as a gyve, is a U-shaped piece of metal secured with a clevis pin or bolt, or a hinged metal loop secured with a quick-release locking pin mechanism. In such an embodiment, the bolt is configured to retracted by pressure and shot by a spring when the pressure is released.

In another embodiment, the locking means 148 may include a latch or a catch. The latch or the catch is a type of mechanical fastener that joins two objects or surfaces while allowing for their regular separation. In such an embodiment, the latch engages the securing means 146 in a detachable manner.

FIG. 5 illustrates the battery housing locking system 144 in accordance with an embodiment of the present disclosure. The shackle 146 is mounted at the bottom side of the movable battery housing 126 and engaged with the latch 148 to lock the battery 128 in the closed position.

In another embodiment of the present disclosure a two-wheeler is provided. In such an embodiment the two-wheeler includes a chassis substantially similar to the chassis 102 illustrated in FIG. 1.

Figure 6:
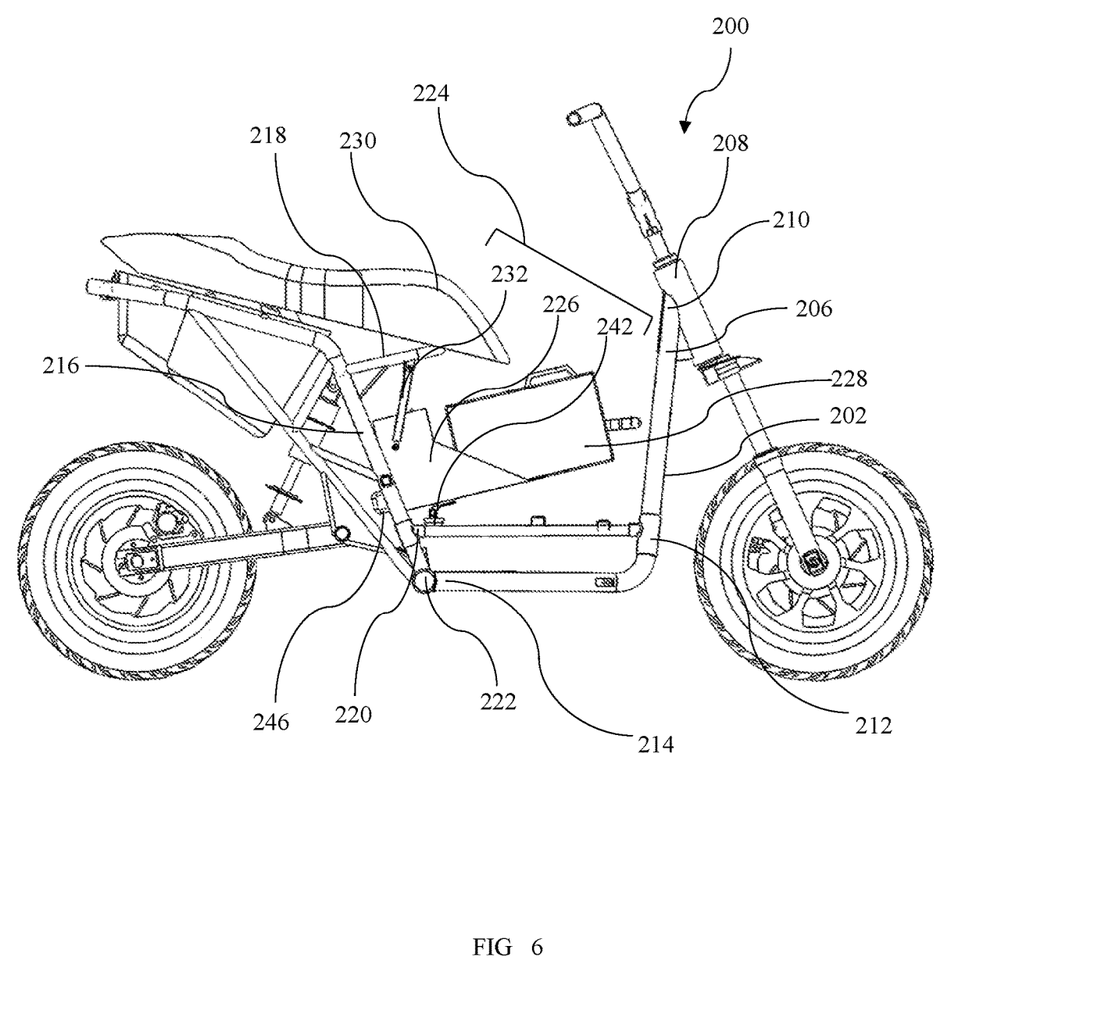
FIG. 6 is a schematic representation of a two-wheeler with a chassis including a battery mounting system in accordance with an embodiment of the present disclosure.

FIG. 6 illustrates the two-wheeler 200 with battery 228 being pulled out. The two-wheeler 200 includes a chassis 202 with a battery mounting system 224. All body parts of the two-wheeler 200 are not shown in FIG. 6 for better visibility of the chassis 202. The chassis 202 includes a first downtube 204 (not shown in FIG. 6) and a second downtube 206 connected to a neck stem 208 of the chassis 202. Each of the first downtube 204 and the second downtube 206 may be divided into an upper front section 210, a lower front section 212, a lower rear section 214, and an upper rear section 216, and a seat support section 218. The lower rear section 214 of the first downtube 204 and the second downtube 206 are connected via a first bar 220 and a second bar 222.

In such an embodiment, the battery mounting system 224 includes a movable battery housing 226 configured to house a battery 228 under a seat 230 supported by the seat support section 218 of the two-wheeler 200 and move between a closed position and an open position.

The battery mounting system 224 also includes at least one support member 232 configured to support the movable battery housing 226. A first end 234 of the at least one support member 232 is coupled to the seat support section 218, and a second end 238 of the at least one support member 232 is coupled to the movable battery housing 226.

The battery mounting system 224 further includes at least one pivot hinge 242 mounted on the first bar 220 and coupled to a front side of the movable battery housing 226, wherein the at least one pivot hinge 242 is configured to support the movable battery housing 226. The at least one support member 232 and the at least one pivot hinge 242 are configured to enable an angular movement of the movable battery housing 226 with respect to a seat axis between the open position and the closed position, thereby enabling replacement of the battery 230 located under the seat 230 of the two-wheeler 200, while maintaining a closed seat position of the seat 230.

In a specific embodiment, the least one support member 232 comprise two support members. A first end of each of the two support members is coupled to bottom side the seat support section 218 and a second end of each of the two support members is coupled to a left side and a right side of the movable battery housing 126, respectively.

In an embodiment, the at least one support member 232 include kinematic linkage. In such an embodiment, the kinematic linkage may be a set of one or more dampers. In an exemplary embodiment, dampers may be a gas spring damper or a hydraulic gas spring.

In another embodiment, the two-wheeler is provided with a battery protective cover (not shown in FIG. 6) configured to completely cover the battery mounting system 224 from a front side. The battery protective cover 250 extends towards rear end of the two-wheeler and combines with a body cover covering rear and sides of the two-wheeler.

In an embodiment, the battery protective cover is provided with a locking mechanism including, but not limited to, a mechanical lock and key mechanism, a lock with an alpha numeric keypad for inputting password, and the like.

In a further embodiment, the two-wheeler 200 also comprises a battery housing locking system 244 which is configured to lock the movable battery housing 226 in the closed position. The battery housing locking system 244 includes a securing means 246 coupled to a bottom side of the movable battery housing 226, and a locking means 248 mounted on the second bar 222 and configured to detachably connect with the securing means 246 in the closed position to lock the battery 228 in the closed position, and disconnect with the securing means 246 upon unlocking of the movable battery housing 226.

In such an embodiment, the securing means 246 may include a hook, a shackle, a metal bar, a deadbolt, a spring bolt, and the like. The locking means 248 may include a latch or a catch.

The two-wheeler is provided with battery management system (BMS) to track the amount of charge remaining in the battery or a system to compute approximate distance that may be covered with the charge remaining in the battery. The two-wheeler is also provided with geolocation tracking system such as GPS, Galileo, GLONASS, BeiDou, NavIC, and the like.

Present disclosure of the chassis for the electric two-wheeler provides an improved and easy design solution for replacement of the battery without opening the seat of the two-wheeler. This may enable the users to authorize third party service providers or authorized person to visit their premises or wherever the electric two-wheeler is located or parked and replace the battery with help of key or password to the battery protective cover without any intervention of the vehicle owner While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A chassis 102 for a two-wheeler 100, comprising:
   a first downtube 104 and a second downtube 106 connected to a neck stem 108 of the chassis 102, wherein each of the first downtube 104 and the second downtube 106 comprises an upper front section 110, a lower front section 112, a lower rear section 114, an upper rear section 116, and a seat support section 118,
      wherein the lower rear section 114 of the first downtube 104 and the second downtube 106 are connected via a first bar 120 and a second bar 122;
   a battery mounting system 124 comprising:
      a movable battery housing 126 configured to house a battery 128 under a seat supported by the seat support section 118 of the chassis 102 and move between a closed position and an open position;
      at least one support member 132 configured to support the movable battery housing 126, wherein a first end 134 of the at least one support member 132 is coupled to the seat support section 118 and a second end 138 of the at least one support member 132 is coupled to the movable battery housing 126;
      at least one pivot hinge 142 mounted on the first bar 120 and coupled to a front side of the movable battery housing 126, wherein the at least one pivot hinge 142 is configured to support the movable battery housing 126, and
   wherein the at least one support member 132 and the at least one pivot hinge 142 are configured to enable an angular movement of the movable battery housing 126 with respect to a seat axis between the open position 127 and the closed position 129, thereby enabling replacement of the battery 128 located under the seat of the two-wheeler 102, while maintaining a closed seat position of the seat.

2. The chassis 102 for the two-wheeler 100 of claim 1, wherein the at least one support member 132 comprises at least one kinematic linkage.

3. The chassis 102 for the two-wheeler 100 of claim 2, wherein the at least one kinematic linkage comprises at least one damper.

4. The chassis 102 for the two-wheeler 100 of claim 3, wherein the at least one damper comprises one of a gas spring damper and a hydraulic gas spring.

5. The chassis 102 for the two-wheeler 100 of claim 1, wherein the at least one support member 132 comprises two support members, wherein a first end of each of the two support members is coupled to the seat support section 118 and a second end of each of the two support members is coupled to a left side or a right side of the movable battery housing 126, respectively.

6. The chassis 102 for the two-wheeler 100 of claim 1, wherein a first end of the support member 132 is coupled to the seat support section 118 and a second end of the support member is coupled to a top side of the movable battery housing 126.

7. The chassis 102 for the two-wheeler 100 of claim 1, wherein the battery mounting system 124 comprises a battery housing locking system 144 configured to lock the movable battery housing 126 in the closed position, wherein the battery housing locking system 144 comprises:
- a securing means 146 coupled to a bottom side of the movable battery housing 126; and
- a locking means 148 mounted on the second bar 122 and configured to detachably connect with the securing means 146 in the closed position to lock the battery 128 in the closed position, and disconnect with the securing means 146 upon unlocking of the movable battery housing 126.

8. The chassis 102 for the two-wheeler 100 of claim 7, wherein the securing means 146 comprises a hook, a shackle, a metal bar, a deadbolt, and a spring bolt.

9. The chassis 102 for the two-wheeler 100 of claim 7, wherein the locking means 148 comprises one of a latch and a catch.

10. A two-wheeler 200, comprising:
- a chassis 202 comprising a first downtube 204 and a second downtube 206 connected to a neck stem 208 of the chassis 202, wherein each of the first downtube 204 and the second downtube 206 comprises an upper front section 210, a lower front section 212, a lower rear section 214, and an upper rear section 216, and a seat support section 218,
    - wherein the lower rear section 214 of the first downtube 204 and the second downtube 206 are connected via a first bar 220 and a second bar 222;
- a battery mounting system 224 comprising:
    - a movable battery housing 226 configured to house a battery 228 under a seat 230 of the two-wheeler 200 and move between a closed position and an open position;
    - at least one support member 232 configured to support the movable battery housing 226, wherein a first end 234 of the at least one support members 232 is coupled to the seat support section 218 and a second end 238 of the at least one support member 232 is coupled to the movable battery housing 226;
    - at least one pivot hinge 242 mounted on the first bar 220 and coupled to a front side of the movable battery housing 226, wherein the at least one pivot hinge 242 is configured to support the movable battery housing 226, and wherein the at least one support member 232 and the at least one pivot hinge 242 are configured to enable an angular movement of the movable battery housing 226 with respect to a seat axis between the open position and the closed position, thereby enabling replacement of the battery 230 located under the seat 230 of the two-wheeler 200, while maintaining a closed seat position of the seat 230.

11. The two-wheeler 200 of claim 10, wherein the at least one support member 232 comprises at least one kinematic linkage.

12. The two-wheeler 200 of claim 11, wherein the at least one kinematic linkage comprises at least one damper.

13. The two-wheeler 200 of claim 12, wherein the at least one damper comprises one of a gas spring damper and a hydraulic gas spring.

14. The two-wheeler 200 of claim 10, wherein the at least one support member 232 comprises two support members, wherein a first end of each of the two support members is coupled to the seat support section 218 and a second end of each of the two support members is coupled to a left side or a right side of the movable battery housing 226, respectively.

15. The two-wheeler 200 of claim 10, wherein the battery mounting system 224 comprises a battery housing locking system 244 configured to lock the movable battery housing 226 in the closed position, wherein the battery housing locking system 244 comprises:
- a securing means 246 coupled to a bottom side of the movable battery housing 226; and
- a locking means 248 mounted on the second bar 222 and configured to detachably connect with the securing means 246 in the closed position to lock the battery 228 in the closed position, and disconnect with the securing means 246 upon unlocking of the movable battery housing 226.

16. The chassis for two-wheeler of claim 15, wherein the securing means 246 comprises a hook, a shackle, a metal bar, a deadbolt, and a spring bolt.

17. The chassis for two-wheeler of claim 15, wherein the locking means 248 comprises one of a latch and a catch.

\* \* \* \* \*